(No Model.)
F. H. RICHARDS.
TAPPING AND FACING MACHINE.
No. 277,611. Patented May 15, 1883.
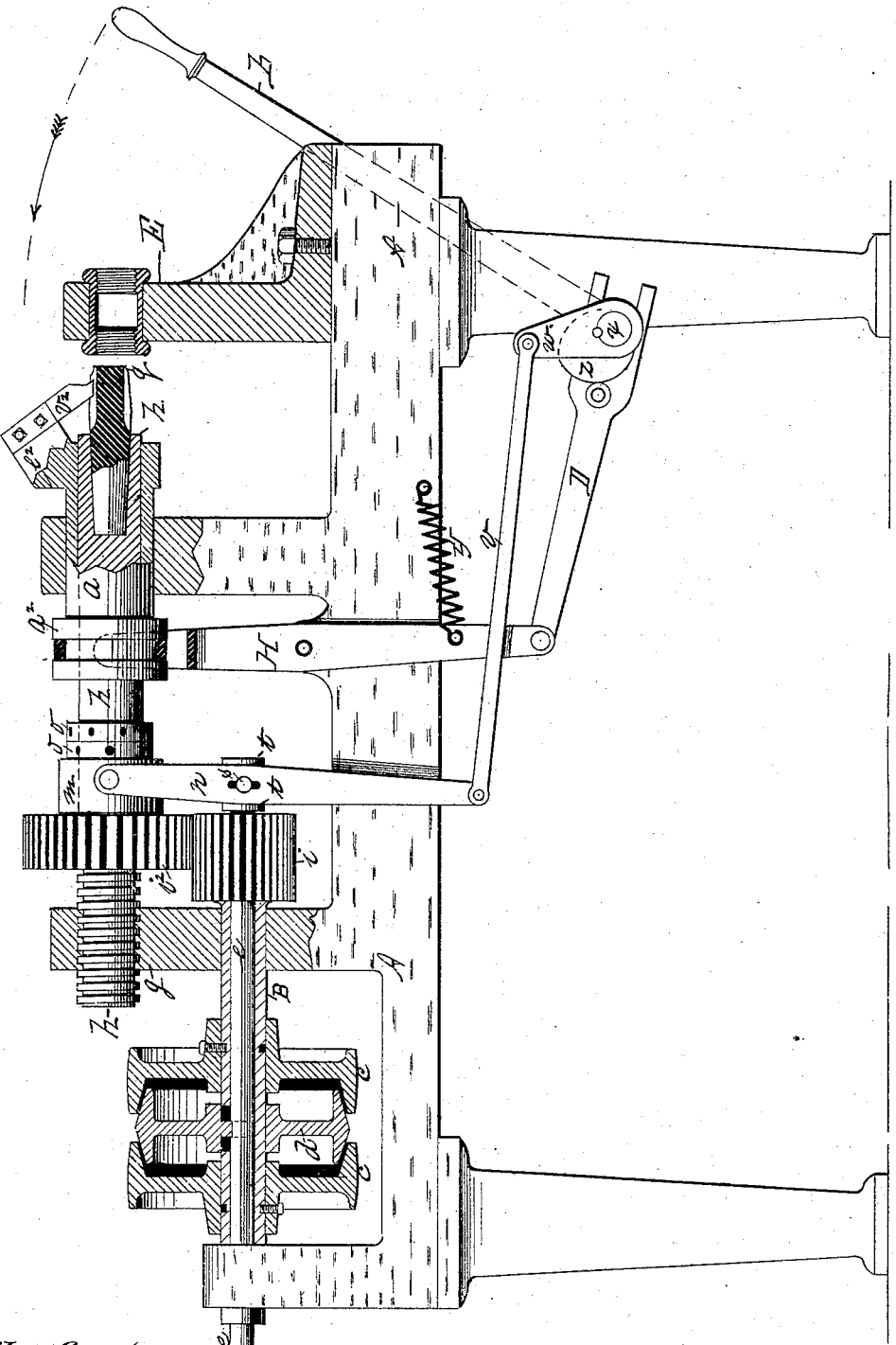
Witnesses:
R. F. Hyde
W. O. Chapin
Inventor:
F. H. Richards,
by Henry A. Chapin
att'y.

UNITED STATES PATENT OFFICE.

FRANCIS H. RICHARDS, OF SPRINGFIELD, MASSACHUSETTS.

TAPPING AND FACING MACHINE.

SPECIFICATION forming part of Letters Patent No. 277,611, dated May 15, 1883.

Application filed October 12, 1882. (No model.)

*To all whom it may concern:*

Be it known that I, FRANCIS H. RICHARDS, a citizen of the United States, residing at Springfield, in the county of Hampden and State of Massachusetts, have invented new and useful Improvements in Tapping and Facing Machines, of which the following is a specification.

This invention relates to improved mechanism for cutting screws in and facing the ends of various articles at one operation, the object being to provide improved devices for carrying a tap and a facing-tool, so that they will both perform their separate functions at the same time, and to provide improved appliances for starting, stopping, and governing the motions of said tools to co-operate therewith.

In the drawing forming part of this specification is illustrated a tapping and facing machine embodying my invention.

In the drawing, A is the frame of the machine. B is a hollow driving-shaft, having proper bearings in frame A, upon which are mounted two loose pulleys, $c\ c$, kept in place by screws through their hubs entering grooves around said shaft, as shown, or by collars or other suitable means, whereby they are prevented from longitudinal movement thereon. A friction-clutch, $d$, is mounted on shaft B, between pulleys $c\ c$, and is adapted to be moved against and to engage with the inner face of the rim of either one of said pulleys. Said clutch $d$ has a short stud or arm projecting from the interior of its hub, and, reaching through a slot in said hollow shaft B, engages with a shipper-rod, $e$, which is adapted to slide in said shaft and to rotate with it. A suitable perforation in or a groove around said rod $e$ is provided, in which the said arm on clutch $d$ may engage, and whereby the latter may be so moved between said pulleys as to engage with either one thereof, or be brought to a non-engaging position, as shown in Fig. 1. A gear, $i$, is secured to one end of said hollow shaft B.

A shaft, $h$, is constructed with a lead-screw on one end, and is adapted to carry a tap, $q$, in its opposite end. A gear, $i^2$, is fixed on shaft $h$, and engages with said gear $i$, the latter being of sufficient length to permit of a longitudinal movement of gear $i^2$ thereon while the latter rotates.

Adjoining gear $i^2$, on shaft $h$, is placed a loose collar, $m$, which is prevented from sliding on said shaft by two circular nuts, $o\ o$, thereon. A shipper-lever, $n$, properly forked to pass up each side of collar $m$, is made to engage with the latter by suitable pins or bolts passing through its arms into said collar. Said shipper-lever $n$ is connected to the sliding rod $e$ in shaft B by means of a collar thereon similar to collar $m$, which is properly held between two nuts, $t\ t$, while rod $e$ is moved by lever $n$, which is connected with said rod by a pin, $s$, which passes through a slot in said lever into said collar. The lower end of shipper-lever $n$ is connected to an arm, $w$, on a rock-shaft, $x$, by a rod, $v$, and said shaft is given a rocking motion by means of the hand-lever $b$, which is moved in the direction indicated by the arrow.

A sleeve, $a$, is fitted to slide on shaft $h$, and is made to rotate therewith by a suitable spline-connection. A facing-tool arm, $e^2$, is provided on the forward end of sleeve $a$, to which is secured the facing-tool $v^2$. A grooved collar, $a^2$, is secured to the rear end of sleeve $a$, and a shipper-lever H is made to engage therewith in the usual manner. Said shipper-lever is pivoted on the frame A, and its lower end to a forked rod, D, whose free end is supported by shaft $x$, on which it has a movement transversely thereto. A cam, $z$, is fixed on said shaft, whose periphery is adapted to bear against a roller on rod D, as shown. A spring, $y$, serves to so swing the lower end of lever H as to retain said roller and cam in contact, so that the movements of said lever are governed by said cam.

The operation of the above-described machine is as follows: The pulleys $c\ c$ are run by belts or other means in opposite directions on shaft B, and the article to be operated upon is so secured in chuck E or other suitable holding device as to have one end presented before the tap $q$ and the facing-tool $v^2$. The screwed end of shaft $h$ engages with a fixed nut, $g$, on frame A. To set the machine in motion, lever $b$ is moved in the direction of the arrow, and rod $e$ is thus moved to the left, carrying with it the clutch $d$ and engaging the latter with the rear pulley $c$, which is belted to rotate shaft $h$ in such a direction as to feed the tap $q$ forward. By the above means shaft B and the lead-screw shaft $h$ are set in motion, and the latter and tap $q$ move toward the article to be tapped, and said tap, entering the latter, is fed forward by said lead-screw, the latter and the tap being provided with screws of corresponding threads. It will be seen that owing to the movement longitudinally of collar $m$ with shaft $h$, clutch $d$ remaining in engagement with said pulley $c$, the shipper-lever $n$ swings during the movement of shaft $h$ forward, and through its connection with shaft $x$ produces a corresponding movement of the hand-lever $b$, which continues while shaft $h$ and the tap move forward; but by arresting said movement of lever $b$, and consequently the swinging of the lower end of lever $n$, the upper end of the latter and the rod $e$, together with clutch $d$, are moved in the direction of the longitudinal movement of shaft $h$, and said clutch is thereby disengaged from pulley $c$, and the machine is stopped, and the action of tap $q$ ceases instantly. By now moving lever $b$ in a direction opposite to that indicated by the arrow, clutch $d$ is engaged with the right-hand pulley $c$, the motion of shaft $h$ is reversed from that first given to it, and the tap is retired.

It will be observed that shaft $h$ has its rotary motion continued only so long as lever $b$ is allowed to swing after the machine is started in either direction. Thus the stoppage of lever $b$ by the operator or by any fixed object at a given point in its movement causes shaft $h$ and the tap it carries to be instantly stopped, thereby determining exactly the distance which the tap is permitted to enter the article which is being operated upon.

As above described, lever $b$ swings or is moved upward by the operator when the shaft $h$ is carrying the tap $q$ into the piece being tapped, and said movement of lever $b$, and the consequent rocking movement of the shaft $x$, rotates cam $z$ against said roller on rod D, and swings lever H, thereby sliding sleeve $a$ on shaft $h$, and carrying the point of the facing-tool $v^2$ against the border of the article which surrounds the tapped hole, thereby causing said border to be faced off simultaneously with the tapping of its interior. The shape of the cam $z$ is such as to produce the proper following movement to correspond with that of the tap, so that the motion of the tool $v^2$, as to time and degree, shall take place after the tap shall have partially performed its work, it being well understood that the forward movement of the facing-tool is necessarily but slight compared to that of the tap.

It is obvious that the tap $q$ may be replaced by a reamer when the machine is required to ream and face work only. The point of the tool $v^2$ is preferably made to penetrate one of the grooves usually cut in tools of the above-named class, so that it shall stand in a proper position to cut the inner border of the tapped or reamed piece of a desirable half-round form, and since the two tools rotate together there is no obstacle to the longitudinal movement of the point of tool $v^2$ in a groove of the other tool.

If desired, the sleeve $a$ may be made with two arms, $e^2$, whereby provision would be made for carrying two facing-tools instead of one; and for work on which it may be desirable to cut slowly, in order to obtain a smoother finish, there would be an advantage in using two facing-tools.

What I claim as my invention is—

1. In a tapping and facing machine, a lead-screw shaft adapted to rotate in a fixed nut and to carry a cutting-tool in one end thereof, a hollow driving-shaft and reversely-operating driving mechanism, substantially as described, connected with said lead-screw shaft, a clutch-shipping rod adapted to slide in said hollow shaft, a shipper-lever pivotally connected with said lead-screw shaft and with said sliding rod, and means, substantially as described, for operating said shipper-lever to start and to stop the machine, combined and operating substantially as set forth.

2. In a tapping and facing machine, the hollow driving-shaft B, a lead-screw shaft adapted to rotate in a fixed nut and to carry a cutting-tool in one end thereof, a sleeve connected to said lead-screw shaft, and having a facing-tool secured thereto and capable, by means substantially as described, of longitudinal movement on said lead-screw shaft, a clutch-shipping rod adapted to slide in said hollow shaft, a shipper-lever pivotally connected with said lead-screw shaft and with said sliding rod, and means, substantially as described, to operate said shipper-lever to start and stop the machine, combined and operating substantially as described.

3. In combination, the lead-screw shaft adapted to rotate in a fixed nut and to carry a cutting-tool in one end thereof, a sleeve adapted to slide on and to rotate with said shaft, and having a facing-tool secured thereto, and mechanism, substantially as described, for imparting a simultaneous rotary motion to said shaft and sleeve and for imparting to said sleeve a sliding motion upon said shaft, substantially as set forth.

4. In combination, the sleeve $a$, adapted to carry the facing-tool $v^2$, the lead-screw shaft $h$, adapted to rotate in a fixed nut, the lever H, adapted to engage with said sleeve, bar D, shaft $x$, and lever $b$, and mechanism, substantially as described, for imparting a rotary motion to said shaft and sleeve, all as set forth.

FRANCIS H. RICHARDS.

Witnesses:
H. A. CHAPIN,
R. F. HYDE.